J. F. ROWLEY.
LOCKING MEANS FOR HINGE PINS.
APPLICATION FILED SEPT. 25, 1919.
1,356,660.
Patented Oct. 26, 1920.
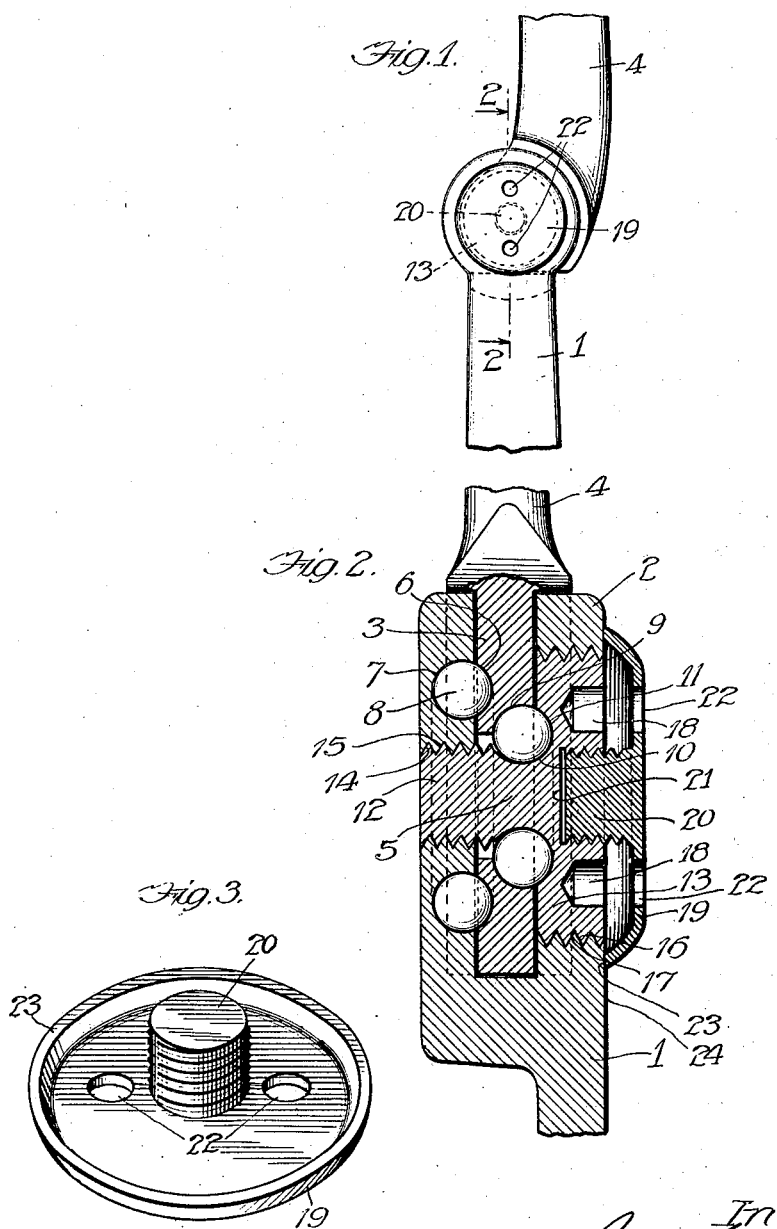

UNITED STATES PATENT OFFICE.

JAMES F. ROWLEY, OF CHICAGO, ILLINOIS.

LOCKING MEANS FOR HINGE-PINS.

1,356,660.  Specification of Letters Patent.  Patented Oct. 26, 1920.

Application filed September 25, 1919. Serial No. 326,282.

*To all whom it may concern:*

Be it known that I, JAMES F. ROWLEY, a citizen of the United States of America, and a resident of Chicago, county of Cook, and State of Illinois, have invented certain new and useful Improvements in Locking Means for Hinge-Pins, of which the following is a specification.

The main objects of this invention are to provide an improved locking means for securing in place a hinge pin which pivotally connects two members; to provide an improved locking means carried by the pin and coacting with the member which supports the pin so as to secure the same against relative moving with respect to said member; and to provide improved means of this kind particularly adapted for use on hinge joints for artificial limbs.

An illustrative embodiment of this invention is shown in the accompanying drawings, in which—

Figure 1 is a side elevation of a pair of pivotally connected members to which has been applied a locking means embodying this invention.

Fig. 2 is an enlarged sectional detail of the same taken on the line 2—2 of Fig. 1.

Fig. 3 is an enlarged perspective view of the locking means.

The specific embodiment of the hinge joint herein shown is such as is commonly used for pivotally connecting two parts of an artificial leg. Such a joint comprises a member 1 having a forked or bifurcated end 2 in which a reduced portion 3 of the member 4 is pivotally supported by a hinge pin 5.

As herein shown, the opposed faces of the part 3 and one part of the bifurcated end 2 are provided with ball races 6 and 7 respectively in which ball-bearings 8 are mounted. Similarly, the opposed faces of said reduced part 3 and the hinge pin 5 are provided with ball races 9 and 10 in which ball-bearings 11 are mounted. The particular arrangement of these ball races and balls is not an essential part of this invention, but is merely illustrative of one form of hinge connection for which this locking means is particularly suitable.

The hinge pin 5 as herein shown comprises a shank 12 and a head 13. The shank 12 is provided with threads 14 whereby the shank is adapted to be screwed into a threaded aperture 15 in one side of the bifurcated end 2. Likewise, threads 16 are formed on the head 12, whereby said head is screwed into a threaded hole 17 formed in the other part of said bifurcated end 2. Recesses 18 are formed in the face of the head 13 so as to receive a spanner wrench by which the pin is secured in place in the member 1 or removed therefrom.

The locking means comprises a plate 19 and a concentrically arranged stem 20. The plate 19 is of concave form and of larger diameter than the head 13 of the hinge pin 5. The stem 20 is threaded so as to screw into an axially disposed threaded recess 21 formed in the end of the head 13. Apertures 22 are formed in the plate 19 to receive the spanner wrench so as to enable the plate to be turned.

The locking means herein shown is applied and operates in substantially the following manner:

The hinge pin 5 is first secured in place to properly connect the members 1 and 4, and the other coacting parts which make up the joint. The locking means is then applied by screwing the stem 20 into the threaded aperture 21, and by means of a spanner wrench, screwing this down as firmly as possible. This action causes the edge or periphery 23 of the plate 19 to firmly bear against the face 24 of the member 1, and at the same time tends to urge the pivot pin 5 axially outward so as to thereby urge the threads 14 and 16 on the shank 12 and head 13 respectively, firmly against the coacting threads of the holes 15 and 17, so that it is practically impossible for the hinge pin 5 to become loosened from the member 1, notwithstanding the shifting pressure of the member 4 against said pin.

Although but one specific embodiment of this invention has been herein shown and described, it will be understood that numerous details of the construction shown may be altered or omitted without departing from the spirit of this invention as defined by the following claims.

I claim:

1. The combination of a pair of members, a hinge pin screwed into one of said members for pivotally connecting said members together, a plate of larger diameter than said hinge pin and having a rim formed and located to engage said member outside of said pin, and coacting means on said plate and pin independent of the threads by which said pin is secured to said one member for drawing the rim of said plate against one of said members so as to frictionally lock said pin to said last mentioned members.

2. The combination of a pair of members, one of said members having a bifurcated end and the other member having a part within said bifurcated end, a hinge pin having threaded engagement with said bifurcated end, said hinge pin having an axially disposed threaded recess formed in one end thereof, an inwardly concave plate having a threaded stem screwed into said recess for drawing the edge of said plate against the adjacent face of said bifurcated end to lock said pin to said one member.

3. The combination of a pair of members, one of said members having a bifurcated end and the other member having a part within said bifurcated end, a hinge pin comprising a head and shank having threaded engagement respectively with the two parts of said bifurcated end, said hinge pin having an axially disposed recess formed in the head thereof, a plate of larger diameter than said head and concavely shaped to provide an annular rim spaced axially away from the body of said plate and located beyond the periphery of said head, a threaded stem on said plate screwed into said recess for drawing the edge of said plate against the adjacent face of said bifurcated end to lock said pin in place.

Signed at Chicago this 23 day of Sept. 1919.

JAMES F. ROWLEY.